United States Patent
Morganson et al.

(10) Patent No.: US 12,011,879 B2
(45) Date of Patent: Jun. 18, 2024

(54) POWDER REMOVAL FROM A PRINTED WORKPIECE

(71) Applicant: Hamilton Sundstrand Corporation, Charlotte, NC (US)

(72) Inventors: David W. Morganson, Marlborough, CT (US); Brendan T. Gustafson, Vernon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 113 days.

(21) Appl. No.: 17/128,610

(22) Filed: Dec. 21, 2020

(65) Prior Publication Data
US 2022/0194007 A1    Jun. 23, 2022

(51) Int. Cl.
*B29C 64/35* (2017.01)
*B29C 64/153* (2017.01)
(Continued)

(52) U.S. Cl.
CPC ............ *B29C 64/35* (2017.08); *B29C 64/153* (2017.08); *B29C 64/245* (2017.08);
(Continued)

(58) Field of Classification Search
None
See application file for complete search history.

(56) References Cited

U.S. PATENT DOCUMENTS

| | | | |
|---|---|---|---|
| 2016/0068793 A1* | 3/2016 | Maggiore | B29C 64/232 901/22 |
| 2017/0036401 A1* | 2/2017 | Donovan | B08B 7/028 |

(Continued)

FOREIGN PATENT DOCUMENTS

| | | |
|---|---|---|
| CN | 107498055 A | 12/2017 |
| CN | 111283191 A | 6/2020 |

(Continued)

OTHER PUBLICATIONS

European Search Report for European Application No. 21206563.5; Application Filing Date: Nov. 4, 2021; dated Apr. 20, 2022; 7 pages.

*Primary Examiner* — Seyed Masoud Malekzadeh
*Assistant Examiner* — Tiffany Yu Huang
(74) *Attorney, Agent, or Firm* — CANTOR COLBURN LLP

(57) ABSTRACT

Disclosed is a system for depowdering a workpiece formed from a reactive powder by an additive manufacturing process. The system includes a powder removal enclosure, an inert gas source, a sealed ultrasonic transducer, an oxygen sensor, and a controller coupled to the sealed ultrasonic transducer and the oxygen sensor. The controller is configured to perform a plurality of operations including monitoring the oxygen sensor to observe an oxygen level within the powder removal enclosure as an inert gas from the inert gas source displaces a gas environment within the powder removal enclosure, and applying electrical power to the sealed ultrasonic transducer within the powder removal enclosure to ultrasonically remove a residual amount of the reactive powder from the workpiece based on determining that the oxygen level within the powder removal enclosure is below a minimum oxygen level threshold.

10 Claims, 4 Drawing Sheets

(51) Int. Cl.
　　　*B29C 64/245*　　(2017.01)
　　　*B29C 64/357*　　(2017.01)
　　　*B29C 64/371*　　(2017.01)
　　　*B29C 64/393*　　(2017.01)
　　　*B33Y 30/00*　　(2015.01)
　　　*B33Y 40/20*　　(2020.01)
　　　*B33Y 10/00*　　(2015.01)
　　　*B33Y 50/02*　　(2015.01)

(52) U.S. Cl.
　　　CPC .......... *B29C 64/357* (2017.08); *B29C 64/371* (2017.08); *B29C 64/393* (2017.08); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | |
|---|---|---|---|
| 2017/0129180 A1* | 5/2017 | Coates | B23Q 11/0046 |
| 2018/0200944 A1* | 7/2018 | Chan | B33Y 30/00 |
| 2019/0315065 A1 | 10/2019 | Hutchinson | |
| 2020/0122396 A1 | 4/2020 | Morganson et al. | |
| 2020/0215614 A1 | 7/2020 | Jiang et al. | |
| 2020/0376786 A1 | 12/2020 | Morganson et al. | |
| 2020/0406533 A1* | 12/2020 | Muranaka | B22F 10/32 |

FOREIGN PATENT DOCUMENTS

| | | |
|---|---|---|
| DE | 102016109212 A1 | 11/2017 |
| EP | 3533538 A1 | 9/2019 |
| WO | 2017198335 A1 | 11/2017 |
| WO | 2019224556 A1 | 11/2019 |

* cited by examiner

POWDER REMOVAL FROM A PRINTED WORKPIECE

BACKGROUND

The present embodiments relate to powder bed fusion and more specifically to a system for removing unused powder from a workpiece printed from an additive manufacturing process.

Powder bed fusion processes are additive manufacturing processes for printing workpieces from metal, ceramic, polymer, and composite powder materials. These processes induce fusion of particles by exposing them to one or more thermal sources, which are generally laser or electron beam sources.

Common approaches for fusion in the liquid phase include full melting, liquid-phase sintering, and indirect fusion. Generally, metal, ceramic, and polymer materials capable of being melted and resolidified can be used for these approaches. With full melting, particles are fused by fully melting them with a high-power laser or electron beam. Liquid-phase sintering uses a mixture of two metal powders or a metal alloy, in which the thermal source melts a lower-melting-temperature constituent, but a higher-melting-temperature constituent remains solid. The lower "melting" temperature constituent is sometimes referred to as the binder particle and the higher melting temperature constituent as the structural particle. An example of indirect fusion is a powder material comprising structural particles (e.g., a metal) coated with a binder (e.g., a polymer). Exposure to the thermal source melts the binder, thus inducing fusion, while the structural particle remains solid.

Besides selecting a powder material and a thermal source, these approaches require that powder fusion occur only within prescribed regions of a bed for a workpiece, and to an appropriate depth. Because workpieces are formed layer-by-layer, powder must be properly handled as each layer of the workpiece is deposited and formed. Various aspects of process control may be managed during powder bed fusion. These include laser-related parameters (e.g., laser power, spot size, pulse duration and frequency); scan-related parameters (e.g., scan pattern, speed and spacing); powder-related parameters (e.g., particle shape, size and distribution, powder bed density, layer thickness, material properties, and uniform powder deposition); and temperature related parameters (powder bed temperature, powder material supply temperature, temperature uniformity, and temperature monitoring).

BRIEF DESCRIPTION

Disclosed is a system for depowdering a workpiece formed from a reactive powder by an additive manufacturing process. The system includes a powder removal enclosure, an inert gas source, a sealed ultrasonic transducer, an oxygen sensor, and a controller coupled to the sealed ultrasonic transducer and the oxygen sensor. The controller is configured to perform a plurality of operations including monitoring the oxygen sensor to observe an oxygen level within the powder removal enclosure as an inert gas from the inert gas source displaces a gas environment within the powder removal enclosure, and applying electrical power to the sealed ultrasonic transducer within the powder removal enclosure to ultrasonically remove a residual amount of the reactive powder from the workpiece based on determining that the oxygen level within the powder removal enclosure is below a minimum oxygen level threshold.

In addition to one or more of the above or below disclosed features, or as an alternate, the sealed ultrasonic transducer can include an ultrasonic transducer within a hermetically sealed housing.

In addition to one or more of the above or below disclosed features, or as an alternate, the system can include a wire guide tube coupled to the sealed ultrasonic transducer, where the wire guide tube is configured to provide a pathway for one or more wires connecting the ultrasonic transducer to the controller.

In addition to one or more of the above or below disclosed features, or as an alternate, the wire guide tube can be configured to provide a cooling path to the ultrasonic transducer within the hermetically sealed housing.

In addition to one or more of the above or below disclosed features, or as an alternate, the sealed ultrasonic transducer can be attached to a build plate of the workpiece.

In addition to one or more of the above or below disclosed features, or as an alternate, the sealed ultrasonic transducer can be attached to a support fixture of the workpiece.

In addition to one or more of the above or below disclosed features, or as an alternate, the support fixture can be isolated from at least one component in the powder removal enclosure by one or more vibration dampers.

In addition to one or more of the above or below disclosed features, or as an alternate, the sealed ultrasonic transducer can be attached to an articulating arm configured to alter an orientation of the workpiece.

In addition to one or more of the above or below disclosed features, or as an alternate, the sealed ultrasonic transducer can be actively cooled while electrical power is applied to the sealed ultrasonic transducer.

In addition to one or more of the above or below disclosed features, or as an alternate, the controller can be further configured to perform operations including monitoring the oxygen level within the powder removal enclosure while electrical power is applied to the sealed ultrasonic transducer, and depowering the sealed ultrasonic transducer based on detecting that the oxygen level has risen above the minimum oxygen level threshold.

Also disclosed is a method of depowdering a workpiece formed from a reactive powder by an additive manufacturing process. The method includes displacing a gas environment within a powder removal enclosure with an inert gas from an inert gas source. An oxygen sensor is monitored, by a controller, to observe an oxygen level within the powder removal enclosure. The controller applies electrical power to a sealed ultrasonic transducer within the powder removal enclosure to ultrasonically remove a residual amount of the reactive powder from the workpiece based on determining that the oxygen level within the powder removal enclosure is below a minimum oxygen level threshold.

In addition to one or more of the above or below disclosed features, or as an alternate, the method can include providing a pathway through a wire guide tube coupled to the sealed ultrasonic transducer for one or more wires connecting the ultrasonic transducer to the controller.

In addition to one or more of the above or below disclosed features, or as an alternate, the method can include attaching the sealed ultrasonic transducer to a build plate of the workpiece.

In addition to one or more of the above or below disclosed features, or as an alternate, the method can include attaching the sealed ultrasonic transducer to a support fixture of the workpiece.

In addition to one or more of the above or below disclosed features, or as an alternate, the method can include isolating the support fixture from at least one component in the powder removal enclosure by one or more vibration dampers.

In addition to one or more of the above or below disclosed features, or as an alternate, the method can include attaching the sealed ultrasonic transducer to an articulating arm configured to alter an orientation of the workpiece.

In addition to one or more of the above or below disclosed features, or as an alternate, the method can include actively cooling the sealed ultrasonic transducer while electrical power is applied to the sealed ultrasonic transducer.

In addition to one or more of the above or below disclosed features, or as an alternate, the method can include monitoring the oxygen level within the powder removal enclosure while electrical power is applied to the sealed ultrasonic transducer and depowering the sealed ultrasonic transducer based on detecting that the oxygen level has risen above the minimum oxygen level threshold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A challenge in printing workpieces with a laser powder bed fusion (LPBF) process is removing unused powder which remains effectively trapped inside the printed workpiece. To remove unused powder from the printed workpiece, it is desirable to break static friction forces between the unused powder and the printed workpiece, and to impart sufficient transferring forces to remove or convey the unused powder away from the workpiece. Powder used in additive manufacturing can be classified as reactive or non-reactive, indicating a risk of fire or explosion when working with a powder. Examples of reactive powders include aluminum and titanium-based alloys. Particle size and environmental factors, such as pressure and temperature, can impact the reactivity of the powder. Embodiments enable depowdering of a workpiece formed from a reactive powder while reducing the risk of fire or explosion typically associated with reactive powders. Although described with respect to reactive powders, it will be understood that the systems described herein can be used with non-reactive powders.

Figure 1:
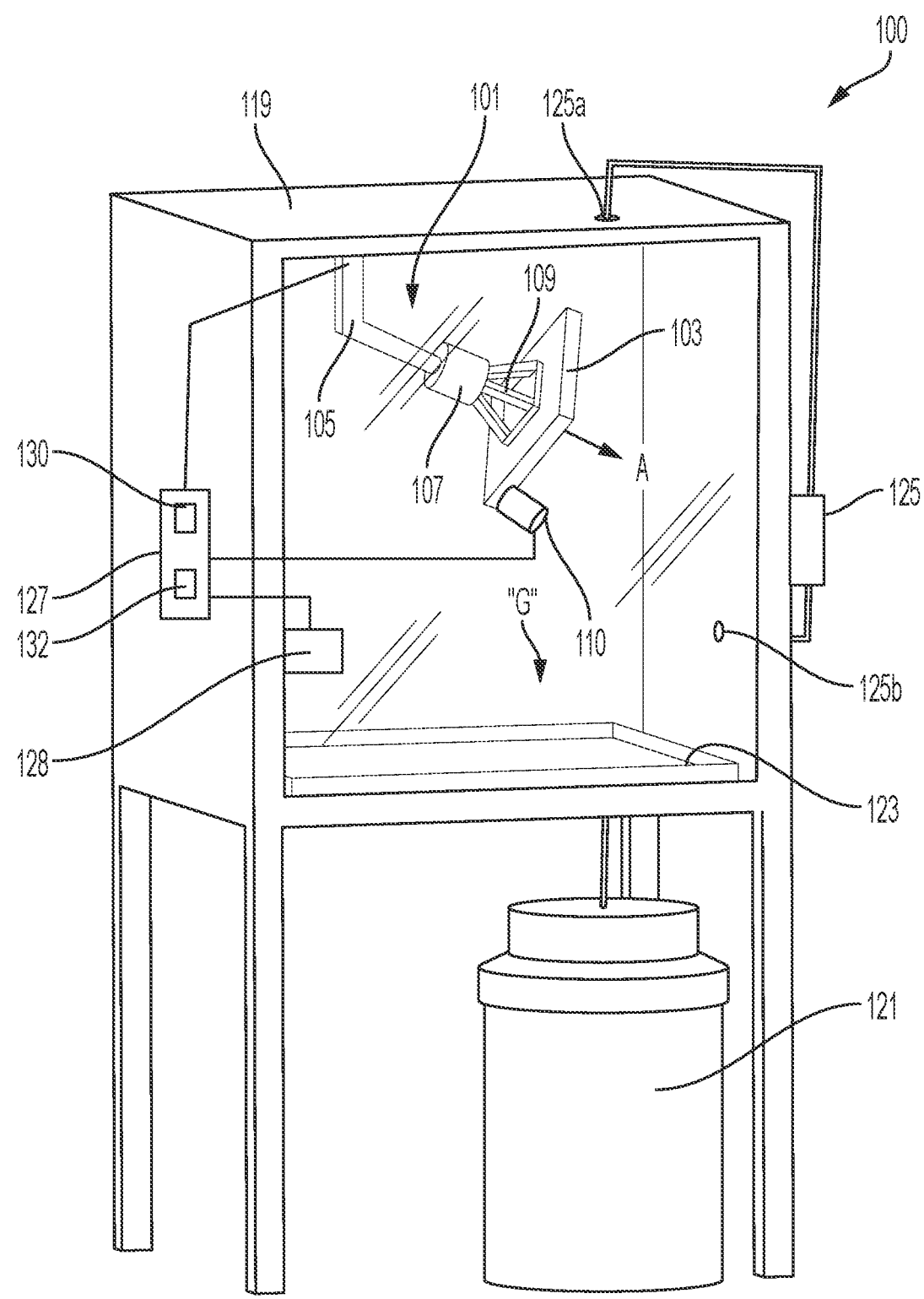
FIG. 1 is a schematic view of a system for depowdering a workpiece according to an embodiment.

Referring now to FIG. 1, an example of a system 100 for removing powder from an additively manufactured article is illustrated. The system 100 includes an adjustable fixture 101 to hold a build plate 103 at a distal end thereof. The adjustable fixture 101 may include one or more actuators. In an embodiment, a first actuator 105 is configured to angle the build plate 103 relative to gravity (e.g., central axis A is moved relative to gravity) and a second actuator 107 is configured to rotate the build plate 103 about a central axis A of the build plate 103. Thus, the adjustable fixture 101 may be an articulating arm configured to alter an orientation of a workpiece (e.g., workpiece 302 of FIG. 3) on the build plate 103. In an embodiment, the first actuator 105 is operable to angle the build plate 103 between about 0 degrees and about 90 degrees relative to gravity. However, any other suitable angle or range of angles, such as between about 0 degrees and about 180 degrees relative to gravity for example, is contemplated herein.

The adjustable fixture 101 may additionally include a coupling 109 mounted between the second actuator 107 and the build plate 103. In some embodiments, the coupling 109 can include vibration dampers to isolate vibration induced by a sealed ultrasonic transducer 110 from other components of the adjustable fixture 101. For example, the sealed ultrasonic transducer 110 can be attached to the build plate 103 and controlled to induce vibration to facilitate removal of excess powder from a workpiece on the build plate 103. Alternatively, the coupling 109 may be rigid, and thus the sealed ultrasonic transducer 110 can be attached elsewhere on the adjustable fixture 101, with vibration from the sealed ultrasonic transducer 110 reaching the build plate 103 through one or more components of the adjustable fixture 101.

The system 100 also includes a powder removal enclosure 119 to retain the removed powder material. The adjustable fixture 101 can be mounted within the powder removal enclosure 119. Environmental parameters within the powder removal enclosure 119 can be monitored and controlled by a controller 127. Examples of environmental parameters can include gas composition, temperature, and pressure. Alternatively, the environmental parameters within the powder removal enclosure 119 can be controlled separately from the controller 127, and the controller 127 can monitor at least one environmental parameter, such as oxygen level using an oxygen sensor 128 operably coupled to the controller 127. The controller 127 can also control the actuators 105, 107 of the adjustable fixture 101. Further, the controller 127 can control the application of electrical power to the sealed ultrasonic transducer 110. Controlling power to the sealed ultrasonic transducer 110 can include controlling amplitude, frequency, and/or phase of the sealed ultrasonic transducer 110. Further, controlling application of electrical power to the sealed ultrasonic transducer 110 may include enabling or disabling a lockout feature to allow the sealed ultrasonic transducer 110 to be powered or prevent the sealed ultrasonic transducer 110 from being powered. It will be understood that coupling with the controller 127 can be through wired or wireless interfaces.

The controller 127 can include a processing system 130 and a memory system 132, where the memory system 132 stores executable instructions to configure the processing system 130 to perform a plurality of operations. The processing system 130 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 132 can store data and instructions that are executed by the processing system 130. In embodiments, the memory system 132 may include random access memory (RAM), read only memory (ROM), or other electronic, optical, magnetic, or any other computer readable medium onto which is stored data and algorithms in a non-transitory form.

The system 100 further includes a powder recover system for recycling or disposing of the removed powder. In an embodiment, the system 100 may include a vacuum operatively connected to the enclosure to evacuate the removed powder therefrom, for example, the powder collected within a catch tray 123 at a base of the powder removal enclosure 119.

A gas flow system 125 may be used to route pressurized gas into the powder removal enclosure 119. In some embodiments, the gas flow system 125 may initially direct pressurized air toward the build plate 103 and then displace the air with an inert gas to facilitate environmental control of the powder removal enclosure 119. Alternatively, the gas flow system 125 may substantially create a vacuum environment within the powder removal enclosure 119 and then add inert gas to the powder removal enclosure 119. The gas flow system 125 can also remove a portion of residual powder from a workpiece as gas is added to or removed from the powder removal enclosure 119. In the illustrated, non-limiting embodiment, the gas flow system 125 includes an inlet 125a and an outlet 125b disposed in any suitable portion of the powder removal enclosure 119. The gas flow system 125 may include an inert gas source 121 that is pressurized and in communication with the powder removal enclosure 119. The gas flow system 125 is operable to circulate gas through the inlet 125a and outlet 125b of the powder removal enclosure 119. The gas flow system 125 can be controlled by the controller 127 or other control means.

In some embodiments, the controller 127 can be coupled to the adjustable fixture 101 to position the build plate 103 via the actuators 105, 107 before, during, or after electrical power is applied to the sealed ultrasonic transducer 110. For example, the controller 127 can command rotation of the build plate 103 to one or more optimal positions at one or more predetermined speeds to facilitate powder removal based on the configuration of the part from which powder is to be removed. The sealed ultrasonic transducer 110 can be controlled to induce vibrations at desired amplitudes and frequencies as the build plate 103 is moved or while the build plate 103 is statically positioned.

The devices and systems as described above allow for an additively manufactured workpiece and corresponding build plate 103 to be depowdered after the workpiece is manufactured on the build plate 103. The build plate 103 can be moved to one or more positions to allow one or more of gravity, vibration, or pressurized gas to urge out an amount of powder within the workpiece. This allows for faster post-processing, as well as batch post-processing. Further, by controlling when the sealed ultrasonic transducer 110 is powered, the system 100 can be used to remove reactive powder that may otherwise be difficult to remove due to the risk of fire or explosion. The sealed ultrasonic transducer 110 reduces the risk of electrical arcing that can occur in typical ultrasonic transducers, where electrical connections may otherwise be exposed to reactive powder as the powder is removed. Further, controlling the internal environment of the powder removal enclosure 119 to prevent activation of the sealed ultrasonic transducer 110 unless a sufficiently low-oxygen environment is established within the powder removal enclosure 119 also reduces the risk of fire or explosion. The combination of at least two risk reduction features provides redundancy in case one feature fails during operation. For example, if a seal of the sealed ultrasonic transducer 110 breaks during operation, the low-oxygen environment within the powder removal enclosure 119 keeps the risk of fire or explosion low. Similarly, if the oxygen level within the powder removal enclosure 119 rises above a minimum oxygen level threshold, the sealed ultrasonic transducer 110 can be sufficient to keep the risk of fire or explosion low. Further, the controller 127 can be configured to depower or lockout operation of the sealed ultrasonic transducer 110 if the oxygen level within the powder removal enclosure 119 is detected to rise above the minimum oxygen level threshold while the sealed ultrasonic transducer 110 is powered. It should be understood that the system illustrated and described here is intended as an example only, and that a system for removing unwanted material having another configuration is also within the scope of the disclosure.

Figure 2:
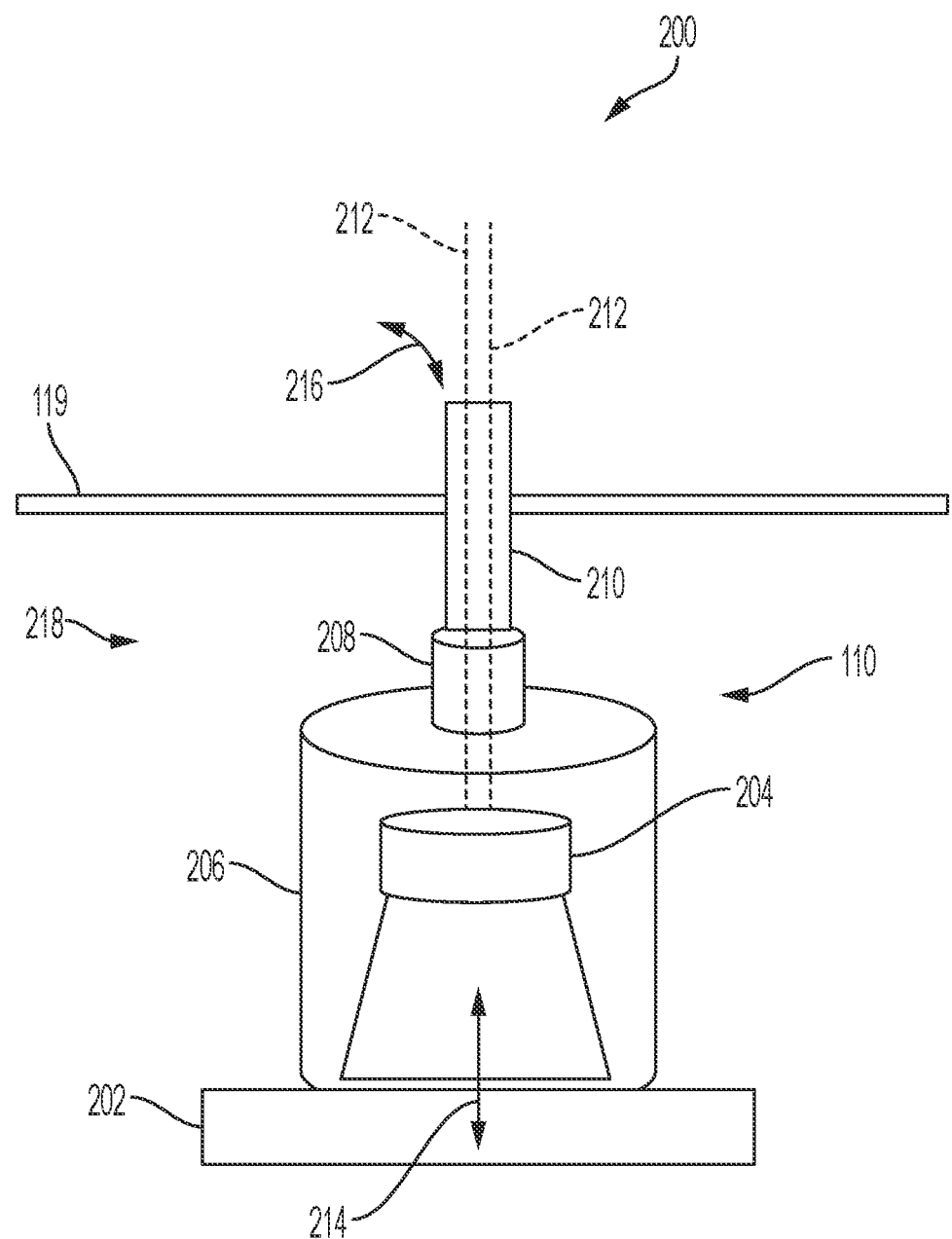
FIG. 2 is a schematic view of a sealed ultrasonic transducer in a system for depowdering a workpiece according to an embodiment.

FIG. 2 is a schematic view of a sealed ultrasonic transducer 110 in a system 200 for depowdering a workpiece according to an embodiment. In the example of FIG. 2, the sealed ultrasonic transducer 110 is attached to a surface 202, which can be any type of fixture that is mechanically coupled to a workpiece to be depowdered. For example, the surface 202 can be the build plate 103, first actuator 105, second actuator 107, coupling 109 of FIG. 1, or any other such component within the powder removal enclosure 119. In the example of FIG. 2, the sealed ultrasonic transducer 110 is depicted in further detail as including an ultrasonic transducer 204 within a hermetically sealed housing 206. The sealed ultrasonic transducer 110 can include a coupling seal 208 that connects the hermetically sealed housing 206 with a wire guide tube 210. The wire guide tube 210 is configured to provide a pathway for one or more wires 212 connecting the ultrasonic transducer 204 to the controller 127 of FIG. 1. The controller 127 of FIG. 1 can control electrical power delivered through the wires 212 to the ultrasonic transducer 204 to induce a vibration 214 into the surface 202 to ultrasonically remove a residual amount of reactive powder from a workpiece within the powder removal enclosure 119.

The wire guide tube 210 can also be configured to provide a cooling path 216 to the ultrasonic transducer 204 within the hermetically sealed housing 206. For example, the internal diameter of the wire guide tube 210 may be wide enough to allow heat generated when the ultrasonic transducer 204 to passively vent external to the powder removal enclosure 119 while maintaining the gas environment 218 within the powder removal enclosure 119. Alternatively, the cooling path 216 can be used to circulate a cooling fluid to actively cool the sealed ultrasonic transducer 110 while electrical power is applied to the sealed ultrasonic transducer 110. The cooling fluid can be a gas or liquid. For example, the cooling fluid can be inert gas released from the inert gas source 121 with positive pressure, such that if a gas leak develops in the sealed ultrasonic transducer 110, inert gas is added to the powder removal enclosure 119.

Figure 3:
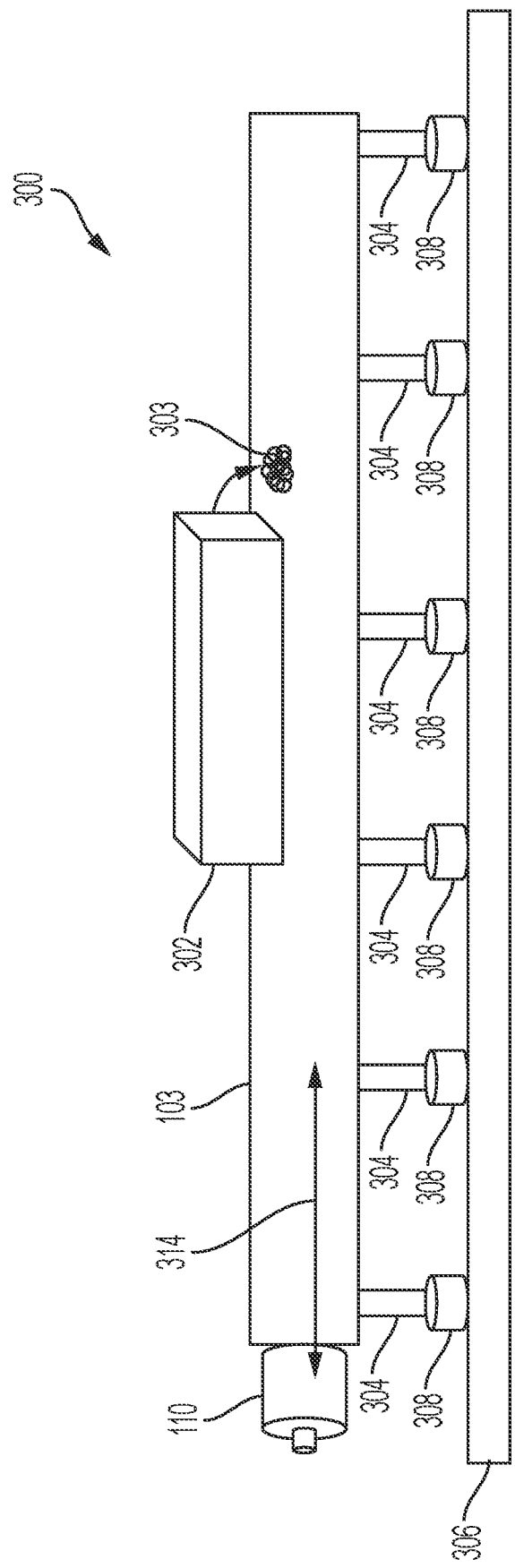
FIG. 3 is a schematic view of a system for depowdering a workpiece according to an embodiment.

FIG. 3 is a schematic view of a system 300 for depowdering a workpiece 302 according to an embodiment. In the example of FIG. 3, the sealed ultrasonic transducer 110 is attached to build plate 103 at a different axial orientation than in the example of FIG. 2. For instance, vibration 214 in FIG. 2 may be with respect to a Z-axis of the workpiece 302, while vibration 314 of FIG. 3 may be with respect to an X-axis or Y-axis of the workpiece 302 depending upon orientation of the workpiece 302. Embodiments can include multiple sealed ultrasonic transducers 110 at various locations and orientations to ultrasonically removing a residual amount of the reactive powder 303 from the workpiece 302 in multiple axial directions. The example of FIG. 3 also illustrates support fixtures 304 that can be coupled to the build plate 103. The support fixtures 304 can be isolated from at least one component 306 in the powder removal enclosure 119 by one or more vibration dampers 308. The at least one component 306 may be a base or side wall of the powder removal enclosure 119, for example. The one or more vibration dampers 308 can be made of any type of damping material suitable for a reactive powder environment. Furthermore, the one or more vibration dampers 308 can be installed in one or more locations in the system 300 to provide vibration damping and isolation between two or more parts. For example, one or more vibration dampers 308 can be installed between the build plate 103 or workpiece 302 and the support fixtures 304 or a fixture plate when the sealed ultrasonic transducer 110 is mounted on the build plate 103 or workpiece 302.

The workpiece 302 can be formed by an additive manufacturing process that uses a reactive powder, such as an LPBF process. The systems 200 and 300 of FIGS. 2 and 3 can be combined or part of system 100 of FIG. 1. Further, the systems 200 and 300 can include other elements previously described with respect to FIG. 1, such as one or more of: inert gas source 121, catch tray 123, gas flow system 125, controller 127, oxygen sensor 128. Other variations can include attaching the sealed ultrasonic transducer 110 directly to the workpiece 302 or to one or more of the support fixtures 304.

Figure 4:
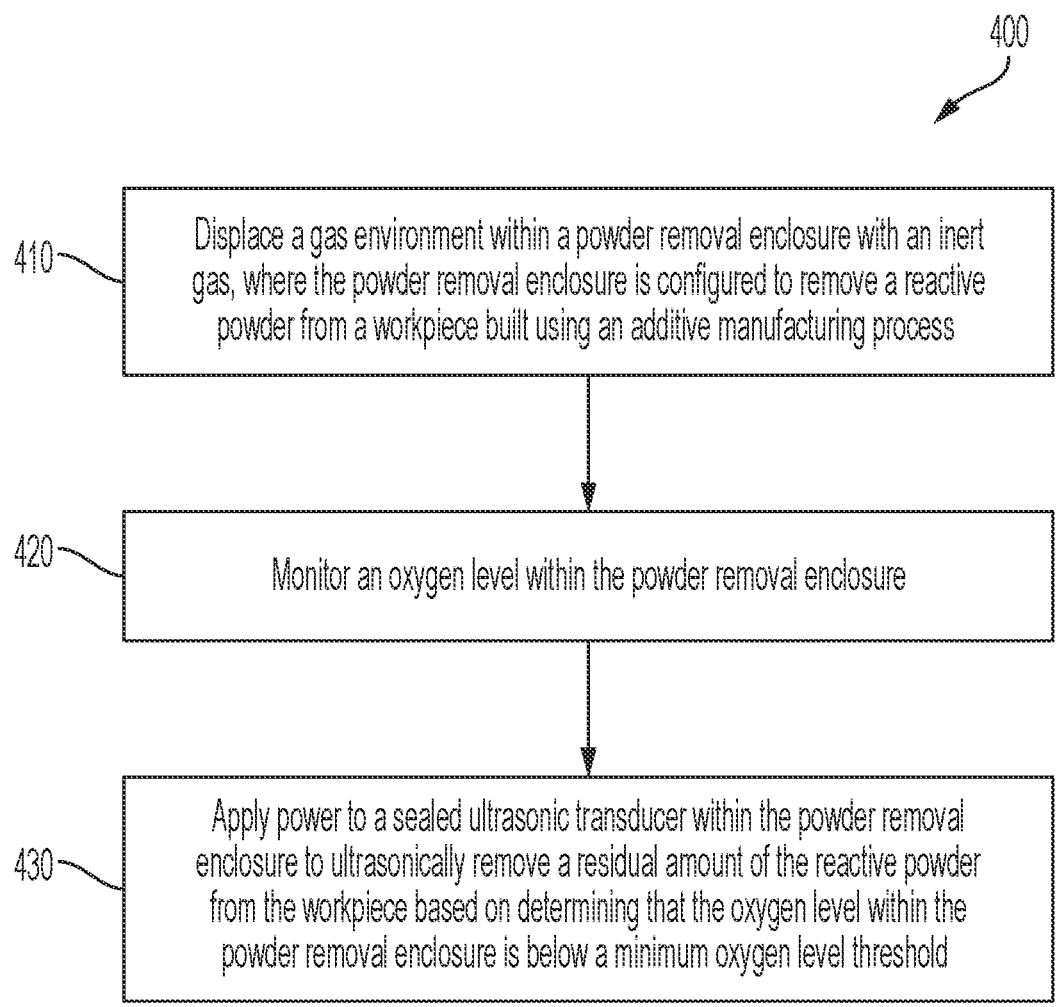
FIG. 4 is a flowchart showing a method of depowdering a workpiece according to an embodiment.

Turning to FIG. 4, a flowchart shows a method 400 of depowdering a workpiece printed from an additive manufacturing process. The method 400 of FIG. 4 is described with respect to FIGS. 1-4 and may include additional steps beyond those depicted in FIG. 4.

At block 410, a gas environment 218 within a powder removal enclosure 119 is displaced with an inert gas from an inert gas source 121. At block 420, controller 127 monitors an oxygen sensor 128 to observe an oxygen level within the powder removal enclosure 119. At block 430, the controller 127 applies electrical power to a sealed ultrasonic transducer 110 within the powder removal enclosure 119 to ultrasonically remove a residual amount of the reactive powder 303 from the workpiece 302 based on determining that the oxygen level within the powder removal enclosure 119 is below a minimum oxygen level threshold (e.g., about 3% oxygen level). The controller 127 can also monitor the oxygen level within the powder removal enclosure 119 while electrical power is applied to the sealed ultrasonic transducer 110 and depower the sealed ultrasonic transducer 110 based on detecting that the oxygen level has risen above the minimum oxygen level threshold.

The sealed ultrasonic transducer 110 can be an ultrasonic transducer 204 within a hermetically sealed housing 206. A wire guide tube 210 can be coupled to the sealed ultrasonic transducer 110, where the wire guide tube 210 provides a pathway for one or more wires 212 connecting the ultrasonic transducer 204 to the controller 127. The wire guide tube 210 can also provide a cooling path 216 to the ultrasonic transducer 204 within the hermetically sealed housing 206. The sealed ultrasonic transducer 110 can be actively or passively cooled while electrical power is applied to the sealed ultrasonic transducer 110. The sealed ultrasonic transducer 110 can be attached to a build plate 103 or any support fixture 304 of the workpiece 302. The build plate 103 or support fixture 304 can be isolated from at least one component 306 in the powder removal enclosure 119 by one or more vibration dampers 308. In some embodiments, the sealed ultrasonic transducer 110 can be attached to an articulating arm (e.g., adjustable fixture 101) configured to alter an orientation of the workpiece 302.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The term "about" is intended to include the degree of error associated with measurement of the particular quantity based upon the equipment available at the time of filing the application.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for depowdering a workpiece formed from a reactive powder by an additive manufacturing process, the system comprising:
    a powder removal enclosure;
    an inert gas source;
    a sealed ultrasonic transducer, wherein the sealed ultrasonic transducer comprises an ultrasonic transducer within a hermetically sealed housing;
    a wire guide tube coupled to the sealed ultrasonic transducer, wherein the wire guide tube is configured to provide a pathway for one or more electrical wires connecting the ultrasonic transducer to a controller, and the wire guide tube is configured to provide a cooling path to the ultrasonic transducer within the hermetically sealed housing;
    an oxygen sensor; and
    the controller coupled to the sealed ultrasonic transducer and the oxygen sensor, the controller configured to perform a plurality of operations comprising:
        monitoring the oxygen sensor to observe an oxygen level within the powder removal enclosure as an inert gas from the inert gas source displaces a gas environment within the powder removal enclosure; and
        applying electrical power to the sealed ultrasonic transducer within the powder removal enclosure to induce vibration to ultrasonically remove a residual amount of the reactive powder from the workpiece based on determining that the oxygen level within the powder removal enclosure is below a minimum oxygen level threshold, wherein the sealed ultrasonic transducer is attached to a build plate or a support fixture coupled to the build plate upon which the workpiece is printed from the reactive powder by laser powder bed fusion.

2. The system of claim 1, wherein the support fixture is isolated from at least one component in the powder removal enclosure by one or more vibration dampers.

3. The system of claim 1, wherein the sealed ultrasonic transducer is attached to an articulating arm configured to alter an orientation of the workpiece.

4. The system of claim 1, wherein the sealed ultrasonic transducer is actively cooled while electrical power is applied to the sealed ultrasonic transducer.

5. The system of claim 1, wherein the controller is further configured to perform operations comprising:
monitoring the oxygen level within the powder removal enclosure while electrical power is applied to the sealed ultrasonic transducer; and
depowering the sealed ultrasonic transducer based on detecting that the oxygen level has risen above the minimum oxygen level threshold.

6. A method of depowdering a workpiece formed from a reactive powder by an additive manufacturing process, the method comprising:
displacing a gas environment within a powder removal enclosure with an inert gas from an inert gas source;
monitoring an oxygen sensor, by a controller, to observe an oxygen level within the powder removal enclosure; and
applying electrical power, by the controller, to a sealed ultrasonic transducer within the powder removal enclosure to induce vibration to ultrasonically remove a residual amount of the reactive powder from the workpiece based on determining that the oxygen level within the powder removal enclosure is below a minimum oxygen level threshold, wherein the sealed ultrasonic transducer comprises an ultrasonic transducer within a hermetically sealed housing, a pathway is provided through a wire guide tube coupled to the sealed ultrasonic transducer for one or more wires connecting the ultrasonic transducer to the controller, wherein the wire guide tube is configured to provide a cooling path to the ultrasonic transducer within the hermetically sealed housing, and wherein the sealed ultrasonic transducer is attached to a build plate or a support fixture coupled to the build plate upon which the workpiece is printed from the reactive powder by laser powder bed fusion.

7. The method of claim 6, further comprising:
isolating the support fixture from at least one component in the powder removal enclosure by one or more vibration dampers.

8. The method of claim 6, further comprising:
attaching the sealed ultrasonic transducer to an articulating arm configured to alter an orientation of the workpiece.

9. The method of claim 6, further comprising:
actively cooling the sealed ultrasonic transducer while electrical power is applied to the sealed ultrasonic transducer.

10. The method of claim 6, further comprising:
monitoring the oxygen level within the powder removal enclosure while electrical power is applied to the sealed ultrasonic transducer; and
depowering the sealed ultrasonic transducer based on detecting that the oxygen level has risen above the minimum oxygen level threshold.

* * * * *